US006190112B1

(12) United States Patent
Danilovic

(10) Patent No.: US 6,190,112 B1
(45) Date of Patent: Feb. 20, 2001

(54) LIFTING DEVICE FOR INSTALLATION IN THE FRAME OF A MOTOR VEHICLE

(75) Inventor: Zoran Danilovic, Toronto (CA)

(73) Assignee: 1244754 Ontario Ltd.

( * ) Notice: Under 35 U.S.C. 154(b), the term of this patent shall be extended for 0 days.

(21) Appl. No.: 09/178,741

(22) Filed: Oct. 27, 1998

(51) Int. Cl.[7] .......... B60P 1/44

(52) U.S. Cl. .......... 414/541; 414/545; 414/921; 414/558; 187/222

(58) Field of Search .......... 414/539, 540, 414/541, 542, 545, 921, 546, 549, 537, 556, 558; 187/222; 254/2 R

(56) References Cited

U.S. PATENT DOCUMENTS

| | | | |
|---|---|---|---|
| 3,638,813 | | 2/1972 | Strong . |
| 3,847,292 | | 11/1974 | Williams et al. . |
| 4,056,203 | | 11/1977 | Meldahl et al. . |
| 4,134,504 | | 1/1979 | Salas et al. . |
| 4,278,389 | | 7/1981 | Konkle . |
| 4,579,503 | | 4/1986 | Disque . |
| 4,606,433 | | 8/1986 | Smalley et al. . |
| 4,616,972 | | 10/1986 | McFarland . |
| 4,797,042 | | 1/1989 | McFarland . |
| 4,847,972 | | 7/1989 | Anderson et al. . |
| 4,909,700 | | 3/1990 | Fontecchio et al. . |
| 4,958,979 | | 9/1990 | Svensson . |
| 5,110,252 | | 5/1992 | Aoki . |
| 5,158,419 | * | 10/1992 | Kempf et al. .......... 414/921 X |
| 5,186,282 | | 2/1993 | Everhard et al. . |
| 5,370,493 | | 12/1994 | Oshima . |
| 5,433,580 | | 7/1995 | Kempf . |
| 5,556,250 | * | 9/1996 | Fretwell et al. .......... 414/558 |
| 5,865,593 | * | 2/1999 | Cohn .......... 414/921 X |
| 5,975,830 | * | 11/1999 | Goodrich et al. .......... 414/921 X |
| 6,071,064 | * | 6/2000 | Hackett .......... 414/545 |

FOREIGN PATENT DOCUMENTS

| | | | |
|---|---|---|---|
| 444386 | * | 9/1991 | (EP) .......... 414/921 |
| 2 224 992 | | 5/1990 | (GB) . |

* cited by examiner

*Primary Examiner*—Frank E. Werner
(74) *Attorney, Agent, or Firm*—Riches, McKenzie & Herbert LLP; Jeffrey Pervanas

(57) ABSTRACT

A lifting device that can be installed in the frame of a motor vehicle is disclosed. A portion of the frame is removed to accommodate the lifting device and the motor vehicle has a subframe attached under the existing frame across the location where the lifting device is installed to structurally support the motor vehicle. In order to fit within the space provided by removal of a portion of the frame, and provide clearance for the van underneath, the lifting device has a movable frame and a platform having a telescoping movable portion. A single driving unit is used to move the telescoping portion out from the stationary portion of the platform and then extend the movable frame from a stored configuration to an extended configuration.

8 Claims, 6 Drawing Sheets

LIFTING DEVICE FOR INSTALLATION IN THE FRAME OF A MOTOR VEHICLE

FIELD OF THE INVENTION

This invention relates to lifting devices for use in motor vehicles, such as vans or buses. More particularly, this invention relates to a wheelchair lifting device that can be inserted in place of a portion of the frame of a motor vehicle and a method for installing the device in a motor vehicle.

BACKGROUND OF THE INVENTION

Wheelchair lifting devices to raise and lower wheelchairs from a surface, such as the ground, to a door of a motor vehicle, such as a van or bus, have been used in the past. However, all of the prior art wheelchair lifting devices have heretofore been large and bulky and required installation with components either inside the compartment of the motor vehicle, or underneath the frame of the motor vehicle.

Accordingly, the prior art wheelchair lifting devices have suffered from several disadvantages. For example, lifting devices within the motor vehicle compartment have occupied usable space within the compartment of the motor vehicle. Lifting devices located underneath the frame of the motor vehicle have been susceptible to damage from stones or dirt during operation of the motor vehicle or being struck by the road surface when a speed bump or pothole is driven over.

Also, many of the prior art devices utilize sensors to detect when the platform of a wheelchair lifting device is in the proper position. Unfortunately, these sensors can become damaged or, if they rely on optical sensing, the optical sensors can become obscured so that they no longer operate. This is particularly troublesome in wheelchair lifting devices which are located underneath the frame of a motor vehicle, and therefore exposed to the elements. In addition, in colder climates, wheelchair lifting devices that are located underneath the frame of a vehicle are exposed to extremely low temperatures, such that either the lifting device, or the sensors, no longer operate.

Accordingly, there is a need in the art for an improved wheelchair lifting device which can be efficiently installed in a motor vehicle without having portions exposed to the elements and the road surface underneath the frame, or, having portions occupying usable space within the interior of the motor vehicle. Also, there is a need in the art for a wheelchair lifting device that is compact so that it can be installed in narrow locations.

SUMMARY OF THE INVENTION

Accordingly, it is an object of this invention to at least partially overcome the disadvantages of the prior art. Also, it is an object of this invention to provide an improved type of wheelchair lifting device and method to install the wheelchair lifting device in a motor vehicle. Furthermore, it is an object of the present invention to provide a method for installing a wheelchair lifting device that does not require much space for installation, and in one embodiment, can be installed in place of a portion of the frame of a motor vehicle.

Accordingly, in one of its aspects, this invention resides in a lifting device for installation in a motor vehicle at a location where a portion of a frame of the motor vehicle has been removed, said device comprising: a stationary frame installable in the location where the portion of the frame has been removed; a movable frame movable with respect to the stationary frame; a platform having a fixed portion fixed to the movable frame and a movable portion movable with respect to the fixed portion; a platform lifting device for lifting and lowering the platform when the movable portion and the movable frame are in an extended position; a driving mechanism operatively engaging the movable frame and the movable portion to separately move the movable frame and the movable portion; and wherein the driving mechanism moves the movable frame and the movable portion from a stored position, where the movable frame, the platform and the platform lifting device are contained within the portion of the frame of the motor vehicle that has been removed, to the extended position where the platform lifting device can lift and lower the platform.

In a further aspect, the present invention resides in a method of placing a lifting device in a motor vehicle having a unibody frame comprising the steps of: attaching a subframe to a lower part of the unibody frame from a first longitudinal position to a second longitudinal position; removing a portion of the unibody frame longitudinally from the first longitudinal position to the second longitudinal position and transversely from a side of the frame a distance sufficient to accommodate the lifting device; and installing the lifting device in a location where the portion of the frame was removed.

Accordingly, one advantage of the present invention is that, in one embodiment, the device can be installed at a location where a portion of the frame of the motor vehicle has been removed. In this embodiment, the device is not exposed to the elements or subject to damage by stones or bumps in the surface of the road. A further advantage of this embodiment of the invention is that the lifting device does not occupy any space within the motor vehicle and the floor of the motor vehicle extends completely across the lifting device.

A further advantage of the present invention is that the lifting device has a single drive mechanism which can move both a telescoping movable portion of the platform and the movable frame. In this way, a simple drive mechanism can be used to move the movable portion of the platform and the movable frame from a stored position to an extended position where it can be used to lift and lower an object, such as a wheelchair. A further advantage of this lifting device is that it is compact and can be installed in a narrow location, such as in the frame of a motor vehicle.

A still further advantage of the present invention is that the wheelchair lifting device does not have any sensors exposed to the outside environment. In other words, all of the sensors required to accurately extend the lifting device from the stored to extended position, or, to lower and lift the platform are located within the stationary frame when the movable frame and platform are in the stored positions.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1A:
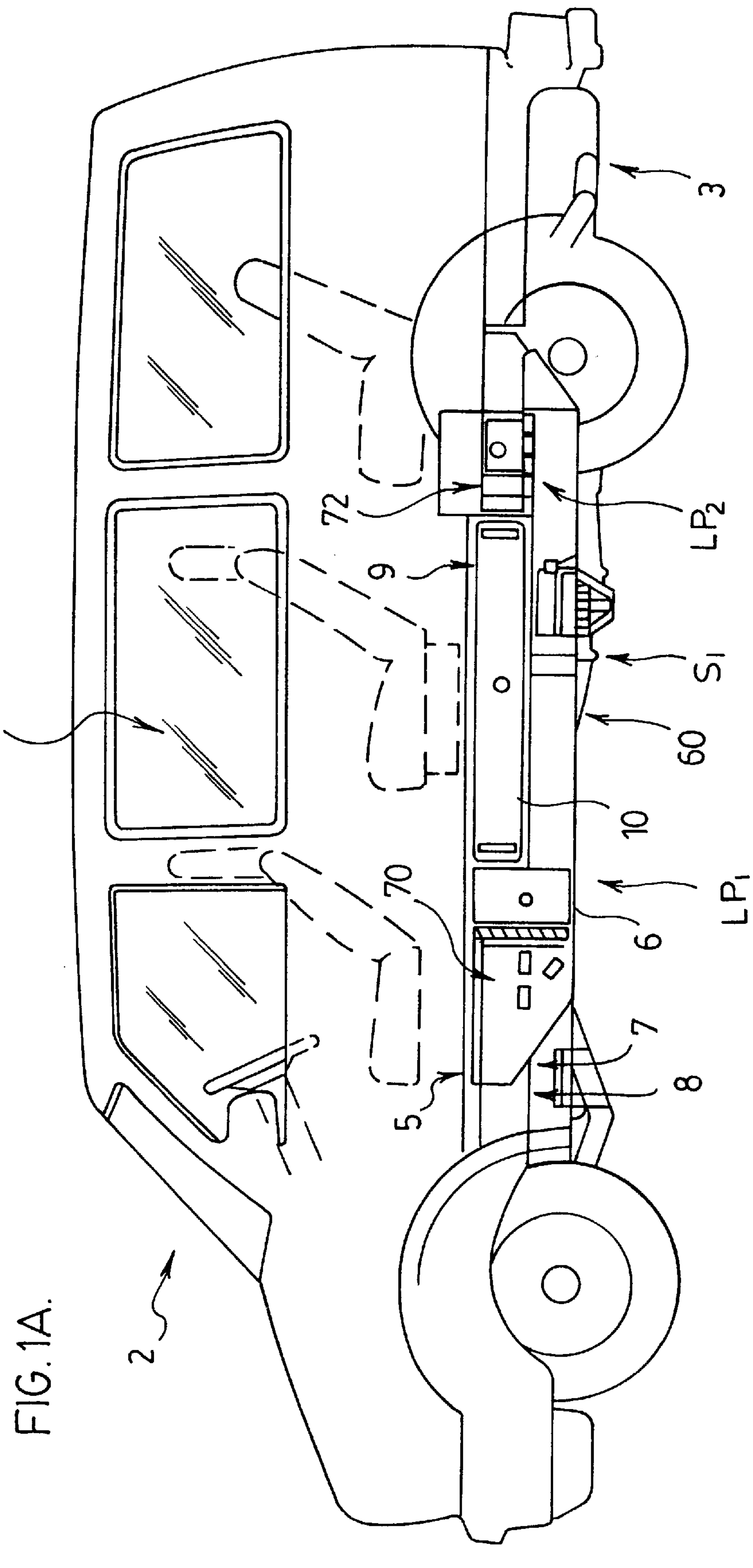
FIG. 1A shows a side view of a motor vehicle frame with the subframe and lifting device installed according to one embodiment of the present invention.
Figure 1B:
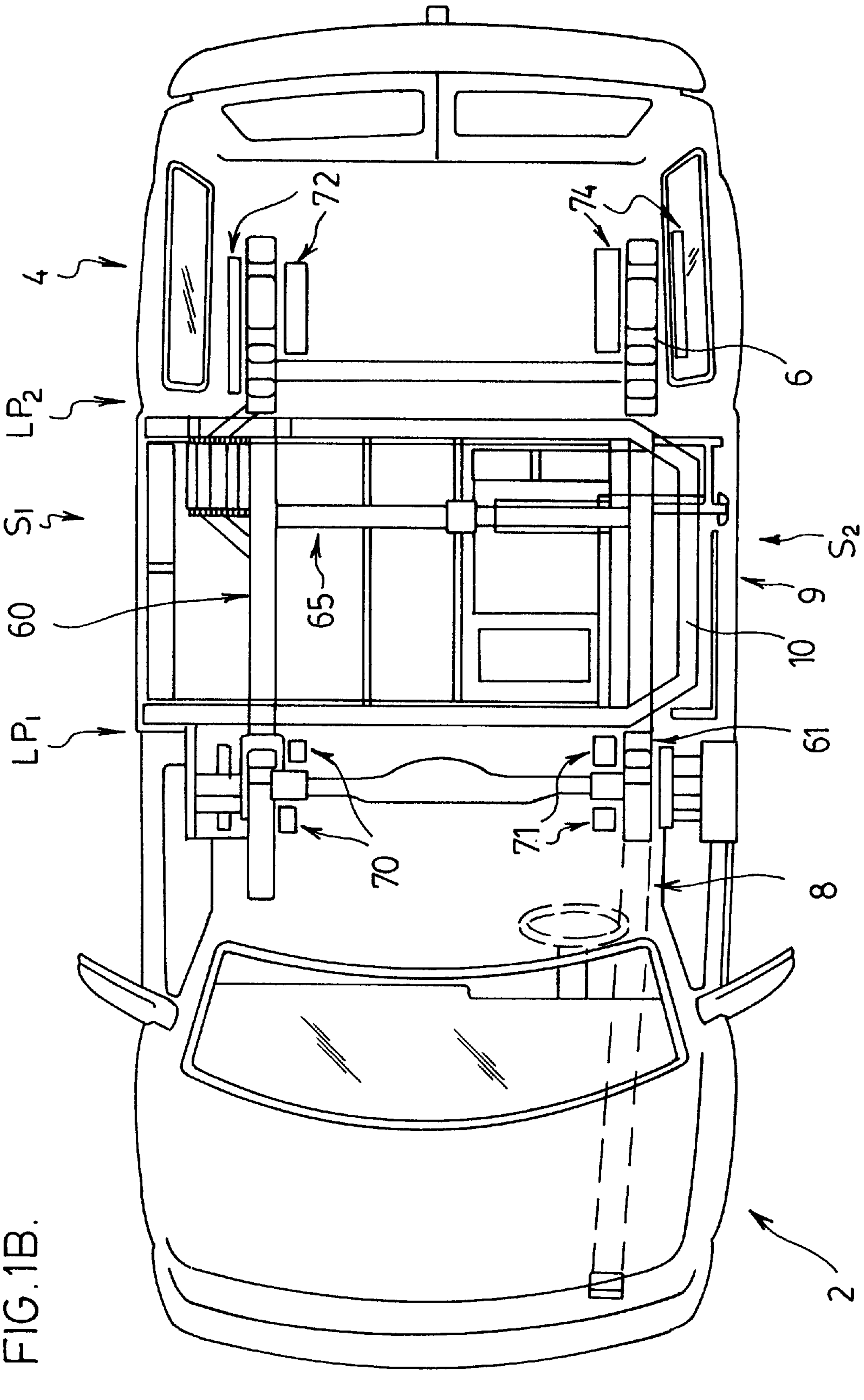
FIG. 1B shows a side view of the motor vehicle shown in FIG. 1A.

FIG. 1A shows a side view of a motor vehicle 2, in this case a van, with a wheelchair lifting device 10 installed therein. FIG. 1B shows a top view of the same motor vehicle 2 with the lifting device 10 installed therein.

As shown in FIGS. 1A and 1B, the motor vehicle 2 has a unibody frame 8. The lifting device is placed in the motor vehicle 2 in place of a portion 9 of the unibody frame 8 which has been removed. This is accomplished as follows.

Initially, a subframe 6 is attached to an exterior surface 7 of a lower part 3 of the unibody frame 8. The subframe 6 is attached between a first longitudinal position $LP_1$ and a second longitudinal position $LP_2$ of the motor 2. The subframe 6 can be attached to the exterior surface 7 of the unibody frame 8 as is known in the art, for example, by welding, mechanical bolts or even an adhesive. Preferably, the subframe 6 is attached to the unibody frame 8 by welding the subframe 6 thereto. The welding can occur at several locations and extend longitudinally along the frame 8 as shown in FIG. 1B. Preferably, the exterior surface 7 is first cleaned and removed of all dirt and rust to ensure that the subframe 6 can be properly attached to the frame 8.

Once the subframe 6 has been attached to the unibody frame 8, the portion 9 of the unibody frame 8 is removed longitudinally from the first longitudinal position and the second longitudinal position. The portion 9 of the unibody frame 8 is also removed transversely from a first side S1 a distance sufficient to accommodate the length of the lifting device 10. In a preferred embodiment, as shown best in FIG. 1B, the unibody frame is removed longitudinally from the first longitudinal position $LP_1$ to the second longitudinal position $LP_2$ and transversely across the width of the van 2 from the first side S1 to the opposite side S2.

The lifting device 10 can then be installed in the location where the portion 9 of the unibody frame 8 was removed, as shown in FIGS. 1A and 1B. As the lifting device 10 is installed in the location where the portion 9 of the frame 8 has been removed, the lifting device 10 does not occupy any of the useable space within the motor vehicle 2. In addition, the floor 5 of the motor vehicle 2 can extend continuously from the first longitudinal position $LP_1$ to the second long $LP_2$ over a portion 9 of the frame 8 that was removed and also over the lifting device 10. In this way, the lifting device 10 can be contained within the space created by removal of the portion 9 of the unibody frame 8. In addition, in a preferred embodiment, the subframe 6 extends continuously underneath the lifting device 10 such that the lifting device 10 is not exposed to the external environment. Also, while the lifting device 10 is covered by the floor 5, the floor 5 is generally not a good insulator such that the device 10 will be at approximately the same temperature as the interior of the van such that the device 10 is not exposed to extreme temperature fluctuations.

As the lifting device 10 is designed to lift objects, such as wheelchairs and their occupants, it is preferable if the lifting device 10 is installed at a location in the motor vehicle where there is a side door 4. The side door 4 is shown in the closed position in FIG. 1A and in the open position in FIG. 1B. Accordingly, in a preferred embodiment, the motor vehicle 2 has a door 4 along the side S1 from which a portion 9 of the frame 8 is removed such that the side door 4 is located substantially between the first longitudinal position $LP_1$ and the second longitudinal position $LP_2$.

It is clear that the subframe 6 structurally replaces the portion 9 of the unibody frame 8 which has been removed longitudinally from the first longitudinal position to the second longitudinal position. Accordingly, the subframe 6 must be of sufficient rigidity to ensure that the unibody frame 8 does not collapse or twist. In order to accomplish this, the subframe 6 comprises main rails 60 and 61 running longitudinally from at least the first longitudinal position $LP_1$ to the second longitudinal position $LP_2$. More than two rails 60, 61 could be used to ensure the structural integrity of the motor vehicle 2. Preferably, the rails 60, 61 are connected by a transverse cross member 65. The rails 60, 61 are connected to plates 70, 71, 72 and 73 which can be connected to the unibody frame 8. Preferably, the rails 60, 61, the cross member 15 and the plates 70, 71, 72, 73 are formed of sheet metal at least comparable to the sheet metal used in the unibody frame 8.

Figure 2:
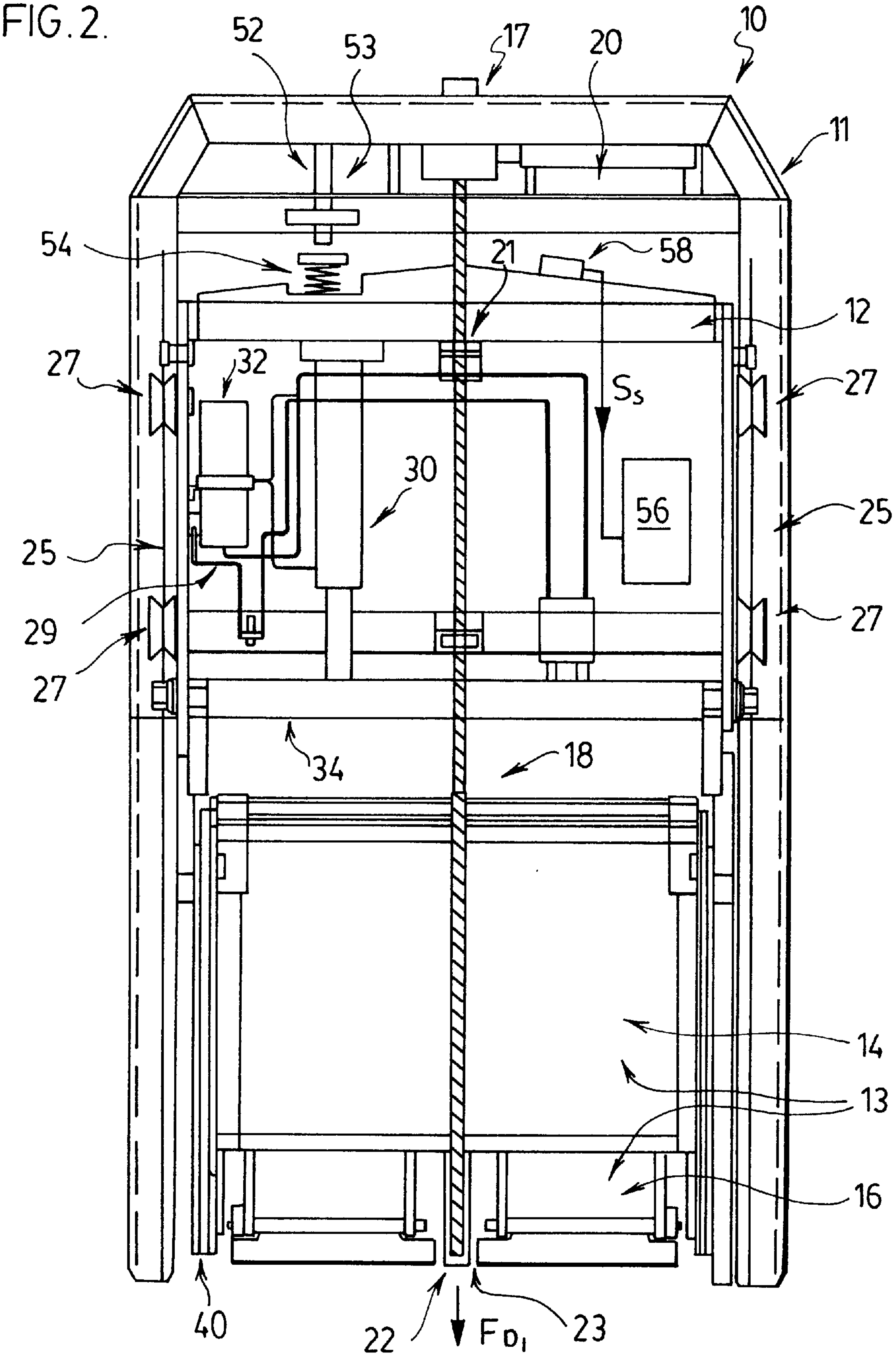
FIG. 2 shows a top view of the wheelchair lifting device according to one embodiment of the present invention in the stored position.

FIG. 2 shows a top view of a lifting device 10, according to one embodiment of the present invention which can be inserted in a location where a portion 9 of the subframe 8 has been removed.

As shown in FIG. 2, the lifting device 10 comprises a stationary frame 11 and a movable frame 12. The stationary frame 11 is installable in the location where the portion 9 of the frame 8 has been removed. The movable frame 12 is movable with respect to the stationary frame 11, and therefore movable with respect to the unibody frame 8 of the motor vehicle 2.

The movable frame 12 carries a platform, shown generally by reference numeral 13, and a platform lifting device, shown generally by reference numeral 29. The platform 13 has a fixed portion 14 which is fixed with respect to the movable frame 12, and a movable portion 16, which is movable with respect to the fixed portion 14 and the movable frame 12. When the platform 13 is in an extended position, as shown in FIGS. 3A, 3B, 4A and 4B, the platform lifting device 29 can lower and lift the platform 13 as further described below.

The device 10 further comprises a driving mechanism, shown generally by reference numeral 17. The driving mechanism operatively engages the movable frame 12 and the movable portion 16 of the platform 13 to separately move the movable frame 12 and the movable portion 16. In this way, the driving mechanism 17 can move the movable frame 12 and the movable portion 16 from a stored position, shown in FIG. 2, where the movable frame 12, the platform 13 and the platform lifting device 29 are contained within the portion 9 of the frame 8 of the motor vehicle 2 that has been removed, to the extended position, shown in FIGS. 3A, 3B, 4A and 4B, where the platform lifting device 29 can lift and lower the platform 13. In order to accomplish this, the driving mechanism 17, in a preferred embodiment, moves the movable frame 12 in a first direction $FD_1$ extending in a plane substantially parallel to the unibody frame 8. The driving mechanism 17 also separately moves the movable portion 16 of the platform 13 in the first direction $FD_1$ such that the movable portion 16 telescopes out from the fixed portion 14. In this way, the same driving mechanism 17 alternately moves the movable portion 16 and the movable frame 12 so that only one driving mechanism 17 is required to move both of these elements, thereby making the lifting device 10 compact and decreasing the production costs.

In a preferred embodiment, as shown in FIG. 2, the driving mechanism 17 comprises at least one threaded member 18, and a motor 20 for rotating the threaded member 18. While in a preferred embodiment, the threaded member 18 is a single threaded rod, it is understood that more than one threaded rod could be used and the threaded member 18 could have a different configuration such as internally or externally threaded cylinders. In any case, the threaded member 18 engages corresponding first threads 21 on the movable frame 12 and corresponding second threads 22 on the movable portion 16. To accomplish this, in a preferred embodiment, the movable portion 16 of the platform 13 comprises a cylinder 23 fixed to the movable portion 16 such that the second threads 22 are located on the inside surface of the cylinder 23 and engage the threaded member 18. This can be accomplished by having the entire inside surface of the cylinder 23 threaded, or, by having a portion of cylinder 23 threaded or by having a threaded nut (not shown) fixed within the cylinder 23. Likewise, the first threads 21 can ;be a threaded portion of the movable frame 12 or a nut (not shown) fixed to the movable frame 12.

Figure 3A:
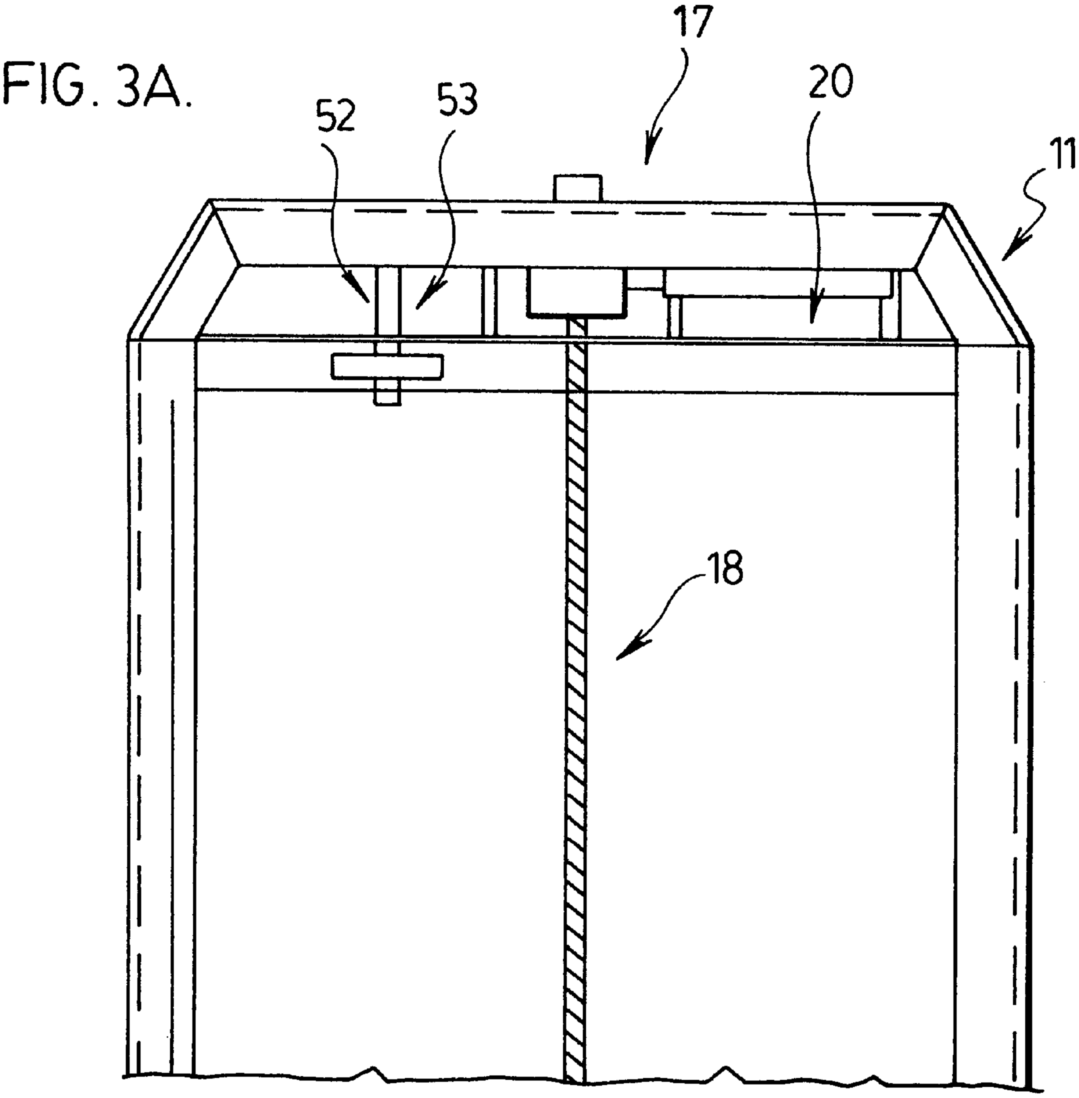
FIGS. 3A and 3B show a top view of the wheelchair lifting device according to one embodiment of the present invention in the extended position.
Figure 3B:
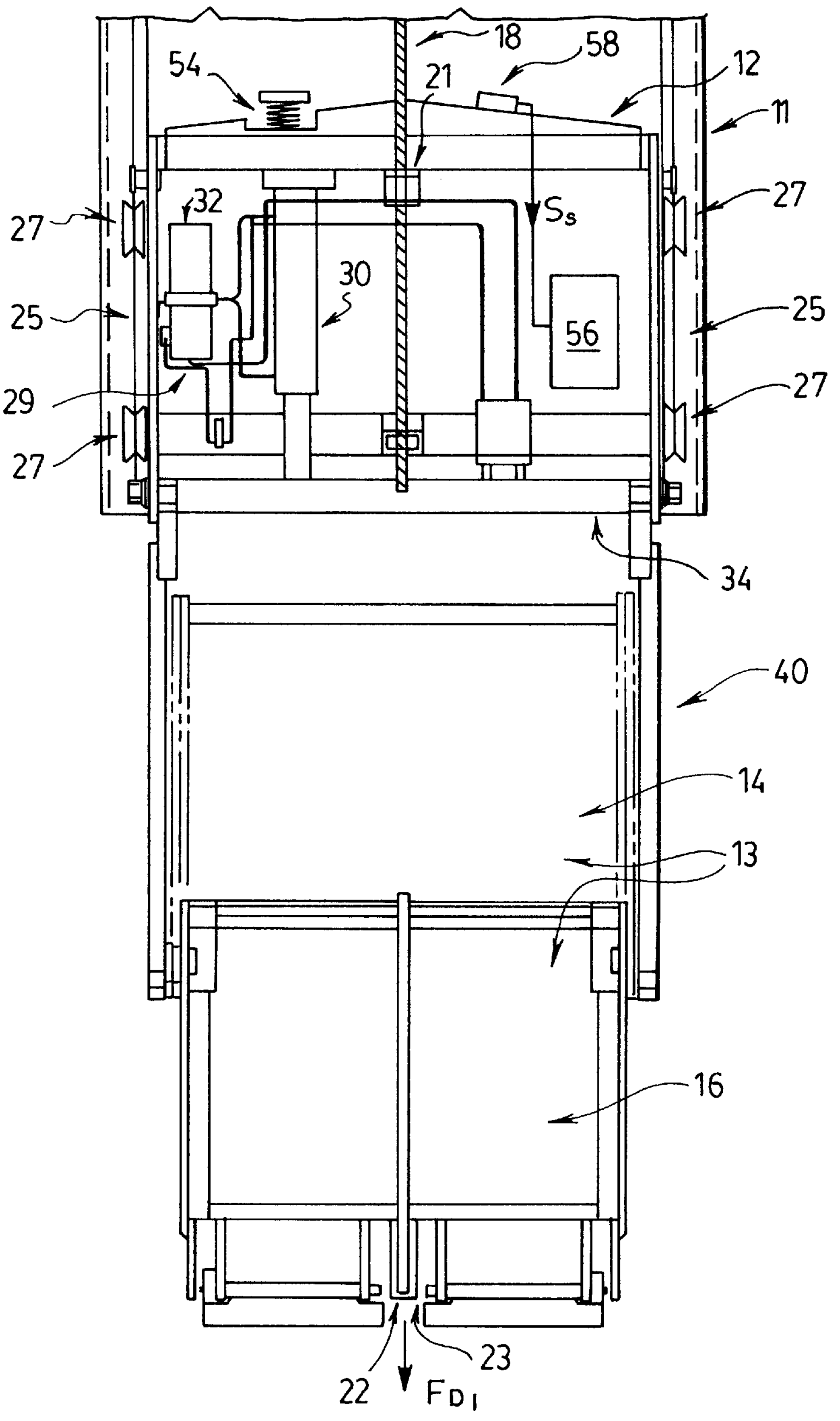

The threaded member 18 initially engages the second threads 22 on the movable portion 16 of the platform 13 to move the movable portion 16 to the platform extended position. In the platform extended position, as shown in FIG. 3B, the movable portion 16 cannot move further with respect to the fixed portion 14 of the platform 13. In this position, continued rotation of the threaded member 18 causes the movable portion 16, the fixed portion 14 and the movable frame 12 to move in unison in the first direction $FD_1$. This movement of the movable frame 12 causes the first threads 21 on the movable frame 12 to engage the corresponding threads on the threaded member 18 and substantially simultaneously disengage the threaded member 18 from the second threads 22. Continued rotation of the threaded member 18 by the motor 20 then causes the movable frame 12 to move with respect to the stationary frame 11 until it reaches the extended position, as shown FIGS. 3A, 3B, 4A and 4B.

It is important that the movable frame 12 not move with respect to the stationary frame 11 until the movable portion 16 of the platform 13 reaches the platform extended position because otherwise the threaded member 18 may engage the first threads 21 prematurely and cause the movable frame 12 to move outwards before the movable portion 16 reaches the platform extended position. To prevent this, the device 10 preferably comprises a maintaining device 52 for maintaining the movable frame 12 near the stationary frame 11. Once the movable portion 16 of the platform 13 has been extended to the platform extended position, continued movement of the movable platform 16 by the driving mechanism 17 in the first direction $FD_1$ overcomes the maintaining means 52 and allows the driving mechanism 18 to move the movable frame 12 with respect to the stationary frame 11.

It is understood that the maintaining device 52 can be any device which can maintain or hold the movable frame 12 near the stationary frame 11 until the movable portion 16 has reached the platform extended position. For example, the maintaining device 52 could comprise a switch and sensor combination (not shown) which permits the movable frame 12 to move once a sensor senses that the movable portion 16 is in the platform extended position.

Alternatively, the maintaining device 52 could comprise a friction fit, such as a ball and joint arrangement (not shown), so that the friction is overcome by the driving mechanism 17 only when the movable portion 16 is in the platform extended position. In a preferred embodiment, the maintaining device 52 comprises a magnetic lock 53 having a threshold force such that the magnetic lock maintains the movable frame 12 near the stationary frame 11 while a separation force separating the movable frame 12 from the stationary frame 11 is below the threshold force and allows the movable frame 12 to move with respect to the stationary frame 11 when this separation force exceeds the threshold force. The motor 20 would be selected such that the threshold force of the magnetic lock is exceeded by the motor 20 continuing to rotate the threaded member 18 when the movable portion 16 is in the platform extended position.

To move the movable frame 12 and movable portion 16 from the extended position to the stored position, the driving mechanism 17 works in the reverse direction. In other words, in the preferred embodiment, the motor 20 rotates the threaded member 18 in a reverse direction. When the threaded member 18 is rotated in the reverse direction, the threaded member 18 initially engages the first threads 21 on the movable frame 12 to move the movable frame towards the stationary frame 11. When the movable frame 12 is near the stationary frame 11, the threaded member 18 then engages the second threads 22 on the movable portion 16 and substantially simultaneously disengages the first threads 21. In this way, continued rotation of the threaded member 18 in the reverse direction moves the movable portion 16 of the platform 13 in a direction opposite the first direction $FD_1$. Continued rotation of the threaded member 18 causes the movable portion 16 to move to the stored position, as well as moving the fixed portion 14 and movable frame 12 into the stored position. In addition, the threads of the threaded member 18 continue to engage the second threads 22 to hold the movable frame 12 and movable portion 16 in the stored position.

To assist the movement of the movable frame 12 with respect to the stationary frame 11, in a preferred embodiment, the lifting device 10 comprises wheels 27 located between the stationary frame 11 and the movable frame 12. More preferably, the wheels 27 are located on the movable frame 12 and engage tracks 25 on the stationary frame 11. In this way, the wheels 27 and tracks 25 decrease the friction between the movable frame 12 and the stationary frame 11, as well as assisting in guiding the movable frame 12 with respect to the stationary frame 11.

Preferably, the lifting device 10 comprises a controller, shown generally by reference numeral 56, for controlling the driving mechanism 17, as well as the platform lifting device 29. The controller 56 receives input signals from the user to move the platform 13 from the stored position to the extended position and back to the stored position. The controller 56 also receives input signals to lower and lift the platform 13 when the movable portion 16 and the movable frame 12 are in the extended position. The user can input signals through an input means (not shown) which can comprise switches located on the motor vehicle 2, as well as signals sent from a remote control.

The device 10 further comprises a stored sensor 58 which senses when the movable frame is in the stored position and sends a stored signal $S_S$ to the controller 56 indicative of whether or not the movable frame 12 is in the stored position. This assists the controller 56 in controlling the movement of the movable frame 12 and the movable portion 16.

Preferably, a biasing device, such as compression spring 54, is located between the stationary frame 11 and the movable frame 12 to bias the movable frame 12 away from the stationary frame with a biasing force. When the movable portion 16 and the movable frame 12 are moved to the stored position by the driving mechanism 17, the spring 54 is compressed. However, once the driving mechanism 17 initially commences to move the movable portion 16, the compression spring 54 biases the movable frame 12 away from the stationary frame 11. The biasing force of the compression spring 54 is sufficient to move the movable frame 12 from the stored position to a location near the stationary frame 11, but is less than the threshold force of the magnetic lock 53. Therefore, the compression spring 54 causes an initial movement of the movable frame 12 by a means other than by the driving mechanism 17 and places the movable frame 12 in the location near the stationary frame 11 so that the threaded member 18 is sure to engage the first threads 21 substantially simultaneously as it disengages from the second threads 22. Also, the initial movement of the movable frame 12 to the location near the stationary frame 11, but not in the stored position, causes the stored signal $S_S$ from the stored sensor 58 to indicate to the controller 56 that the movable frame 12 is not in the stored position.

Figure 4A:
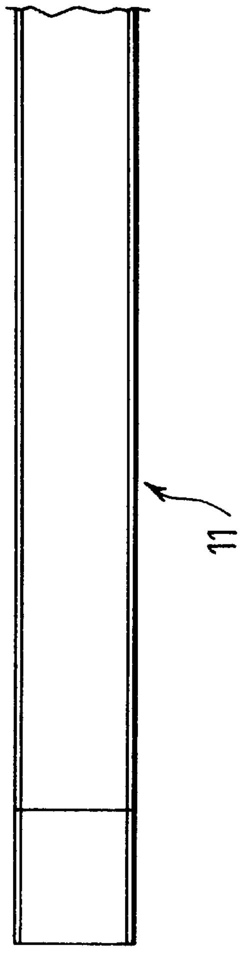
FIGS. 4A and 4B show a side view of the wheelchair lifting device according to one embodiment of the present invention in the extended position.
Figure 4B:
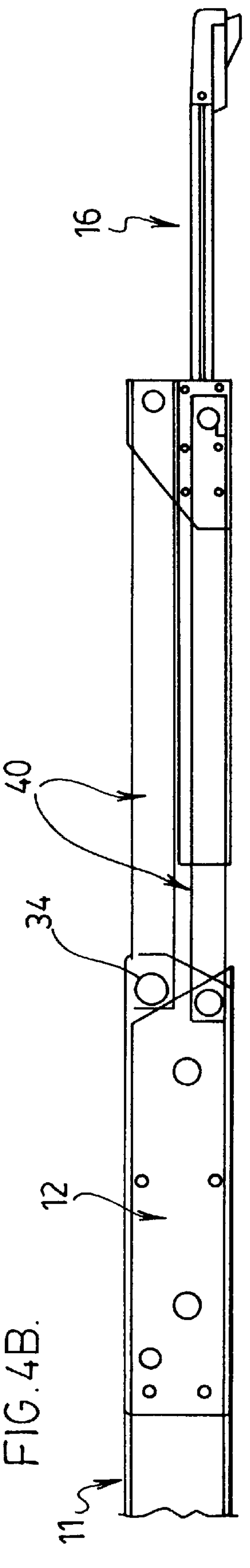

Once the movable frame 12 and the movable portion 16 is in the extended position, the platform lifting device 29 can lower and lift the platform 13. In a preferred embodiment, the platform lifting device comprises a truss 40, as shown in FIG. 4B, which supports the platform 13. The truss 40 has a master shaft 34 such that rotation of the master shaft causes the truss 40 to raise and lower the platform 13. The platform lifting device 29 further comprises a hydraulic cylinder 30 and a pump 32. In response to input signals from the user, the controller 56 actuates the pump 32 and hydraulic cylinder 30 to rotate the master shaft 34, thereby lowering and raising the platform 13.

It is understood that while the present invention has been described in terms of a lifting device to lower and lift the wheelchair and its occupant, the invention is not limited to this function. Rather, the lifting device 10 can be used to lower and lift any object in the capacity of the lifting device 29.

Furthermore, while the lifting device 10 has been described in terms of a lifting device to be inserted in place of a portion 9 of a frame 8 of a motor vehicle 2 that has been removed, the lifting device 10 is not limited to this function, but rather could be installed in any location. Because of the narrow profile of the lifting device 10, which in a preferred embodiment is less than five inches high, it is well suited for insertion in a location created by removal of a portion 9 of a unibody frame 8. In addition, even though the device 10 has been shown inserted in a van, it is understood that the device can be inserted in any type of motor vehicle 2, such as a bus, a recreational vehicle, a trailer, a minivan, a truck or an automobile.

It will be understood that, although various features of the present invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A lifting device for installation in a motor vehicle at a location where a portion of a frame of the motor vehicle has been removed, said device comprising:

a stationary frame installable in the location where the portion of the frame has been removed;

a movable frame movable with respect to the stationary frame;

a platform having a fixed portion fixed to the movable frame and a movable portion movable with respect to the fixed portion;

a platform lifting device for lifting and lowering the platform when the movable portion and the movable frame are in an extended position;

a driving mechanism operatively engaging the movable frame and the movable portion to separately move the movable frame and the movable portion, said driving mechanism comprising a threaded member and a motor for rotating the threaded member, said threaded member engaging corresponding first threads on said movable frame and corresponding second threads on said movable portion such that rotation of said threaded member by said motor can separately move the movable frame and the movable portion;

maintaining means for maintaining the movable frame near the stationary frame while the driving mechanism is moving the movable portion of the platform;

wherein, once the movable portion of the platform has been extended to a platform extended position, continued movement of the movable platform by the driving mechanism overcomes the maintaining means such that the driving mechanism can then move the movable frame with respect to the stationary frame;

wherein the driving mechanism moves the movable frame and the movable portion from a stored position, where the movable frame, the platform, the platform lifting device and the driving mechanism are contained within the portion of the frame of the motor vehicle that has been removed, to the extended position where the platform lifting device can lift and lower the platform.

2. The device as claimed in claim 1 wherein the driving mechanism moves the movable frame in a first direction and the driving mechanism separately moves the movable portion of the platform in the first direction.

3. The device has claimed in claim 1 wherein the threaded member initially engages the second threads on the movable portion of the platform to move the movable portion to the platform extended position and the movable portion cannot move further with respect to the fixed portion; and wherein once the movable portion is in the platform extended position, continued rotation of the threaded member moves the movable portion, fixed portion and movable frame so that the first threads engage the threaded member and the second threads substantially simultaneously disengage from the threaded member.

4. The device as claimed in claim 3 wherein the maintaining means comprises:

a magnetic lock having a threshold force such that the magnetic lock maintains the movable frame near the stationary frame until the threshold force is overcome and allows the movable frame to move with respect to the stationary frame when the threshold force has been overcome; and wherein once the movable portion is in the platform extended position, continued rotation of the threaded member moves the movable portion, fixed portion and movable frame so that the threshold force of the magnetic lock is overcome.

5. The device as claimed in claim 4 further comprising:

control means for controlling the driving mechanism and the platform lifting device in response to input signals;

stored sensor means for sensing when the movable frame is in the stored position and sending a signal to the control means indicative of whether the movable frame is in the stored position;

biasing means located between the stationary frame and the moveable frame to bias the movable frame away from the stationary frame by a biasing force wherein the biasing force is below the threshold force of the magnetic lock but sufficient to move the movable frame from the stored position to the location near the stationary frame when the threaded member initially engages the second threads on the movable portion and moves the movable portion; and wherein the signal from the stored sensor means indicates the movable frame is not in the stored position after the biasing means moves the movable frame to the location near the stationary frame.

6. The device as claimed in claim 3 wherein to move the movable frame and movable portion from the extended position to the stored position, the motor rotates the threaded member in a reverse direction; and wherein, when rotated in the reverse direction, the threaded member initially engages the first threads on the movable frame and moves the movable frame towards the stationary frame;

wherein, when the movable frame is near the stationary frame, the threaded member engages the second threads and substantially simultaneously disengages the first threads such that continued rotation of the threaded member in the reverse direction moves the movable portion to the stored position.

7. The device as claimed in claim 1 further comprising wheels located between the stationary frame and the movable frame to assist in moving the movable frame with respect to the stationary frame.

8. The device as claimed in claim 1 wherein the platform lifting device comprises:

a truss supporting the platform and having a master shaft; and rotation means connected to the master shaft;

wherein actuation of the rotation means causes rotation of the master shaft to lower and raise the platform.

* * * * *